(12) United States Patent
Lin et al.

(10) Patent No.: US 11,112,270 B2
(45) Date of Patent: Sep. 7, 2021

(54) ATTITUDE SELF-COMPENSATION METHOD TO THE TRANSMITTERS OF WMPS BASED ON INCLINOMETER

(71) Applicant: Tianjin University, Tianjin (CN)

(72) Inventors: Jiarui Lin, Tianjin (CN); Jigui Zhu, Tianjin (CN); Yongjie Ren, Tianjin (CN); Linghui Yang, Tianjin (CN); Siyang Guo, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 16/073,793

(22) PCT Filed: Dec. 25, 2017

(86) PCT No.: PCT/CN2017/118162
§ 371 (c)(1),
(2) Date: Jul. 29, 2018

(87) PCT Pub. No.: WO2018/223666
PCT Pub. Date: Dec. 13, 2018

(65) Prior Publication Data
US 2020/0378792 A1    Dec. 3, 2020

(30) Foreign Application Priority Data

Jun. 6, 2017  (CN) .......................... 201710419021.0

(51) Int. Cl.
*G01C 21/00*    (2006.01)
*G01C 21/20*    (2006.01)
(Continued)

(52) U.S. Cl.
CPC ............ *G01C 25/00* (2013.01); *G01B 11/002* (2013.01); *G01C 9/06* (2013.01); *G01C 2009/066* (2013.01)

(58) Field of Classification Search
CPC ...... G01C 21/00; G01C 21/206; G01C 25/00; G01C 9/06; G01C 2009/066; G01B 11/0002
(Continued)

(56) References Cited

PUBLICATIONS

He Feiyan, "Optimized Pose Measurement System Combining Monocular Vision with Inclinometer Sensors", ACTA Optica Sinica, Dec. 2016, vol. 36, No. 12.
(Continued)

*Primary Examiner* — Daniel L Murphy
(74) *Attorney, Agent, or Firm* — George G. Wang; Bei & Ocean

(57) ABSTRACT

The present invention discloses an attitude self-compensation method to the transmitters of wMPS based on inclinometer, including the following steps: step 1: arranging inclinometer-combined transmitters according to the mechanism structure of the transmitters; step 2: building a horizontal reference frame based on an automatic level and guide rail; step 3: calibrating rotation relationship between the inclinometer and transmitter coordinate systems by referring to the horizontal reference frame according to the measurement model of the inclinometer and rotation measurement model of the transmitter; step 4: updating the orientation parameters of the transmitters in real time according to the output values of the inclinometer and compensation algorithm for the orientation parameters. The method of the present invention aims at self-compensating the orientation parameters of transmitters in real time and increasing the stability of the system. By the attitude change of the inclinometer, this method can compensate the attitude change of transmitters in real time, improve the stability of the measurement system, and adapt to the harsh environment.

6 Claims, 2 Drawing Sheets

(51) Int. Cl.
*G01C 25/00* (2006.01)
*G01B 11/00* (2006.01)
*G01C 9/06* (2006.01)

(58) Field of Classification Search
USPC .................................................... 356/139.1
See application file for complete search history.

(56) References Cited

PUBLICATIONS

Chen Yang, "A Hybrid of Vision and Inclination Sensor Method for Estimating Relative Pose", ACTA Optica Sinica, Dec. 2015, vol. 35, No. 12.

ATTITUDE SELF-COMPENSATION METHOD TO THE TRANSMITTERS OF WMPS BASED ON INCLINOMETER

FIELD OF THE INVENTION

The present invention relates to the large-scale 3D coordinates measurement method and in particular to an attitude self-compensation method of the transmitters based on photoelectric scanning of a workshop Measurement Positioning System (wMPS), which can be widely used in large-scale manufacturing fields such as aerospace, aviation and shipbuilding.

BACKGROUND OF THE INVENTION

As a novel large-scale workshop measuring and positioning system using multi-station spatial constraints, the workshop Measuring and Positioning System (hereinafter referred to as wMPS), having advantages such as high accuracy, wide range and multi-station synchronizing measurements, is widely used for precision measurement and positioning in the manufacture of large-scale components. The wMPS is a high-accuracy multi-station measurement system. Learning from the Global Positioning System, the wMPS can regularly arrange a plurality of transmitters in the measurement system so as to establish a large-scale high-accuracy measurement network via calibration. In the overall measurement network, orientation parameters of the transmitters significantly affect the measurement accuracy of the whole system, thus stable and accurate orientation parameters are a basic premise for high-accuracy measurement. However, due to the more and more complicated application environments, transmitters in the measurement space are inevitably affected by external vibration or long-term creep deformation of the support structure, resulting in inaccurate orientation parameters. The current effective method is to recalibrate the system periodically, but the repeated calibration (including benchmark calibration and coordinates control network calibration) will inevitably lead to a large amount of repeated manual operations, which is inefficient.

SUMMARY OF THE INVENTION

The objectives of the present invention are to overcome the defects of the prior art and to provide an attitude self-compensation method to the transmitters based on an inclinometer. This method of the present invention aims at self-compensating the orientation parameters of transmitters in real time and increasing the stability of the system. According to the attitude change of the inclinometer, this method can compensate the attitude change of transmitters in real time, improve the stability of the measurement system, and adapt to the harsh environment.

The purpose of the present invention is achieved by the following technical scheme:

Step 1: arranging inclinometer-combined transmitters according to the mechanism structure of the transmitters;

Step 2: building a horizontal reference frame based on an automatic level and guide rail;

Step 3: calibrating a rotation relationship between the inclinometer and transmitter coordinate systems by referring to the horizontal reference frame according to the measurement model of the inclinometer and rotation measurement model of the transmitter;

Step 4: updating the orientation parameters of the transmitters in real time according to the output values of the inclinometer and compensation algorithm for the orientation parameters.

Wherein, the steps of "building a horizontal reference frame" in Step 2 are as follows:

Step 2-1: arranging an automatic level, and adjust it by the bubble level called "optical composite image level" to parallel to the horizontal plane;

Step 2-2: arranging a plurality of spherical receivers and the corresponding spherical holders;

Step 2-3: Arranging a lifting guide rail which is fixed with said spherical holders, replacing the spherical receivers with spherically mounted retroreflectors (SMR) of the laser tracker on the holders, adjusting the guide rail to ensure that the center of each SMR is in the same horizontal plane by using the automatic level, thus, obtaining the target points; each SMR has a diameter of 1.5 inches;

Step 2-4: Measuring target points and other points by the laser tracker and establishing the horizontal reference frame $O_h$-$x_h y_h z_h$ in accordance with the target points as xoy plane.

Wherein, the steps of "calibrating a rotation relationship between the inclinometer and transmitter coordinate systems" in Step 3 are as follows:

Step 3-1: Arranging transmitters in front of the horizontal reference frame according to the measurement range of the transmitters, and measuring every target point of the horizontal reference frame by the transmitters;

Step 3-2: defining a transmitter coordinate system $O_t$-$x_t y_t z_t$, calculating a rotation matrix from the transmitter coordinate system to the horizontal reference frame according to the measurement model of the transmitter, wherein the relationship between the two coordinates is as follows:

$$\begin{bmatrix} a_m \cos\theta_m + b_m \sin\theta_m \\ a_m \sin\theta_m - b_m \cos\theta_m \\ c_m \\ d_m \end{bmatrix}^T \cdot \begin{bmatrix} R_T^H & T_T^H \\ 0 & 1 \end{bmatrix} \cdot \begin{bmatrix} x_h \\ y_h \\ z_h \\ 1 \end{bmatrix} = 0$$

Where ($a_m$, $b_m$, $c_m$, $d_m$) m=1, 2 is the optical plane equation, m is the number of the optical plane equation, $\theta$ is the sweep angle of the transmitter, ($x_h$, $y_h$, $z_h$) are the coordinates of a horizontal reference frame; and $R_T^H$, $T_T^H$ are a rotation matrix and a translation matrix from the transmitter coordinate system to the horizontal reference frame, respectively;

Step 3-3: Obtaining rotation matrix $R_T^H$ from the transmitter coordinate system to the horizontal reference frame via a space resection measurement method;

Step 3-4: Establishing an inclinometer measurement model, and defining the inclinometer coordinate system to $O_i$-$x_i y_i z_i$;

Step 3-5: Converting readings of the inclinometer to rotation angle around the corresponding axis with respect to the inclinometer measurement model;

$$\begin{cases} \theta_i = \alpha \\ \gamma_i = -\arcsin\left(\dfrac{\sin\beta}{\cos\alpha}\right) \end{cases}$$

Where $\alpha$ and $\beta$ are the readings, $\theta_i$ and $\gamma_i$ are rotation angles around x and y axes, respectively;

And the equation of rotation matrix $R_H^I$ from the horizontal reference frame to the inclinometer coordinate system is:

$$R_H^I = R_{yi} \cdot R_{xi} \cdot$$

$$R_{zi} = \begin{bmatrix} \cos\gamma_i & 0 & \sin\gamma_i \\ 0 & 1 & 0 \\ -\sin\gamma_i & 0 & \cos\gamma_i \end{bmatrix} \begin{bmatrix} 1 & 0 & 0 \\ 0 & \cos\theta_i & -\sin\theta_i \\ 0 & \sin\theta_i & \cos\theta_i \end{bmatrix} \begin{bmatrix} \cos\psi_i & -\sin\psi_i & 0 \\ \sin\psi_i & \cos\psi_i & 0 \\ 0 & 0 & 1 \end{bmatrix}$$

Where $\psi_i$ is the rotation angle around z-axis in the rotation matrix;

Step 3-6: Defining rotation matrix $R_T^I$ from the transmitter coordinate system to the inclinometer coordinate system, and parameterizing the rotation matrix as follows:

$$R_H^T = (R_T^H)^{-1} = \begin{bmatrix} r_1 & r_2 & r_3 \\ r_4 & r_5 & r_6 \\ r_7 & r_8 & r_9 \end{bmatrix} \quad R_T^I = \begin{bmatrix} r_{i1} & r_{i2} & r_{i3} \\ r_{i4} & r_{i5} & r_{i6} \\ r_{i7} & r_{i8} & r_{i9} \end{bmatrix}$$

Where $r_1 \ldots r_9$ are known parameters, and $r_{i1} \ldots r_{i9}$ are parameters to be solved;

Step 3-7: Obtaining $R_H^I = R_T^I R_H^T$ according to rigid transformation relations, and obtaining the following equations after mathematical processing:

$$\begin{cases} r_{i1}r_3 + r_{i2}r_6 + r_{i3}r_9 = -\cos\theta_i \sin\gamma_i \\ r_{i4}r_3 + r_{i5}r_6 + r_{i6}r_9 = \sin\theta_i \\ r_{i7}r_3 + r_{i8}r_6 + r_{i9}r_9 = \cos\theta_i \cos\gamma_i \end{cases} ;$$

Step 3-8: Regulating at least three attitudes of the transmitter by mechanical adjustment, constructing a non-linear optimization objective equation combining the orthogonal constraints of the rotation matrix and performing optimization solution via iterative algorithm as $$E = \sum_{j=1}^{n} (F_{j1}^2 + F_{j2}^2 + F_{j3}^2) + M \sum_{j=1}^{6} f_j^2,$$

where n is the number of attitudes of the transmitter by mechanical adjustment, n>=3.

The steps of "updating the orientation parameters of the transmitters in real time" of step 4 are as follows:

Step 4-1: Obtaining readings of the inclinometer in real time, calculating the rotation matrix from the horizontal reference frame to the inclinometer coordinate system;

Step 4-2: Calculating the updated attitude matrix of the transmitter according to the calibrated rotation matrix from the transmitter coordinate system to the inclinometer coordinate system, compensating the new attitude of the transmitter and obtaining the attitude compensation algorithm as follows:

$$(C_T)_{new} = (R_T^I)^{-1} \cdot (R_H^I)_{new} \cdot ((R_H^I)_{old})^{-1} \cdot R_T^I \cdot (C_T)_{old}$$

Where $(C_T)_{new}$, $(C_T)_{old}$ are new transmitter coordinate system and initial transmitter coordinate system, respectively; $(R_H^I)_{new}$, $(R_H^I)_{old}$ are new rotation matrix and initial rotation matrix of the inclinometer, respectively.

The settling uncertainty accuracy of the automatic level is no more than 0.3", measured standard deviation per round trip is no more than ±1 mm.

Compared with prior art, the technical scheme of the present invention has the following beneficial effects:

According to the high-precision angle measurement principle of the inclinometer, the present invention can continuously acquire the attitude change of the inclinometers, and update the attitude of the transmitters according to the attitude relationship between inclinometer coordinate system and transmitter coordinate system. The method of the present invention solves the problem that the transmitter attitude change cannot be compensated in real time due to the vibration in the harsh environment, effectively avoids repetitive large-scale recalibration, and enhances system robustness.

DETAILED DESCRIPTION OF THE EMBODIMENTS

The present invention will be further described accompanying with the figures.

The present invention combines the high-accuracy two-axis inclinometer into the transmitter of the wMPS, and provides a method for self-compensating the orientation parameters of transmitters in real time, calibrating a transmitter coordinate system and inclinometer coordinate system by space resection measurement method, compensating attitude of the transmitters in real time according to the attitude change variation of the inclinometer, thus enhancing the system robustness in the harsh environment.

Figure 1:
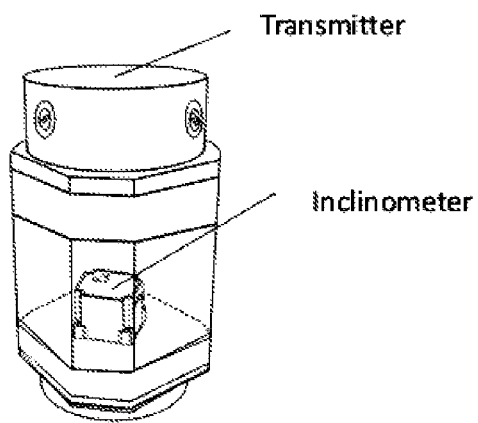
FIG. 1 is a perspective cross-section diagram of an inclinometer-combined transmitter of the present invention.

The attitude self-compensation method to the transmitters based on inclinometer scanning of wMPS of the present invention is achieved by the following steps:

Step 1: as shown in FIG. 1, fixing the inclinometer in the transmitters according the mechanism structure of the transmitter and characteristics of the inclinometer, wherein the angular accuracy of the inclinometer is less than 2", and the cross coupling error is less than 0.72".

Figure 2:
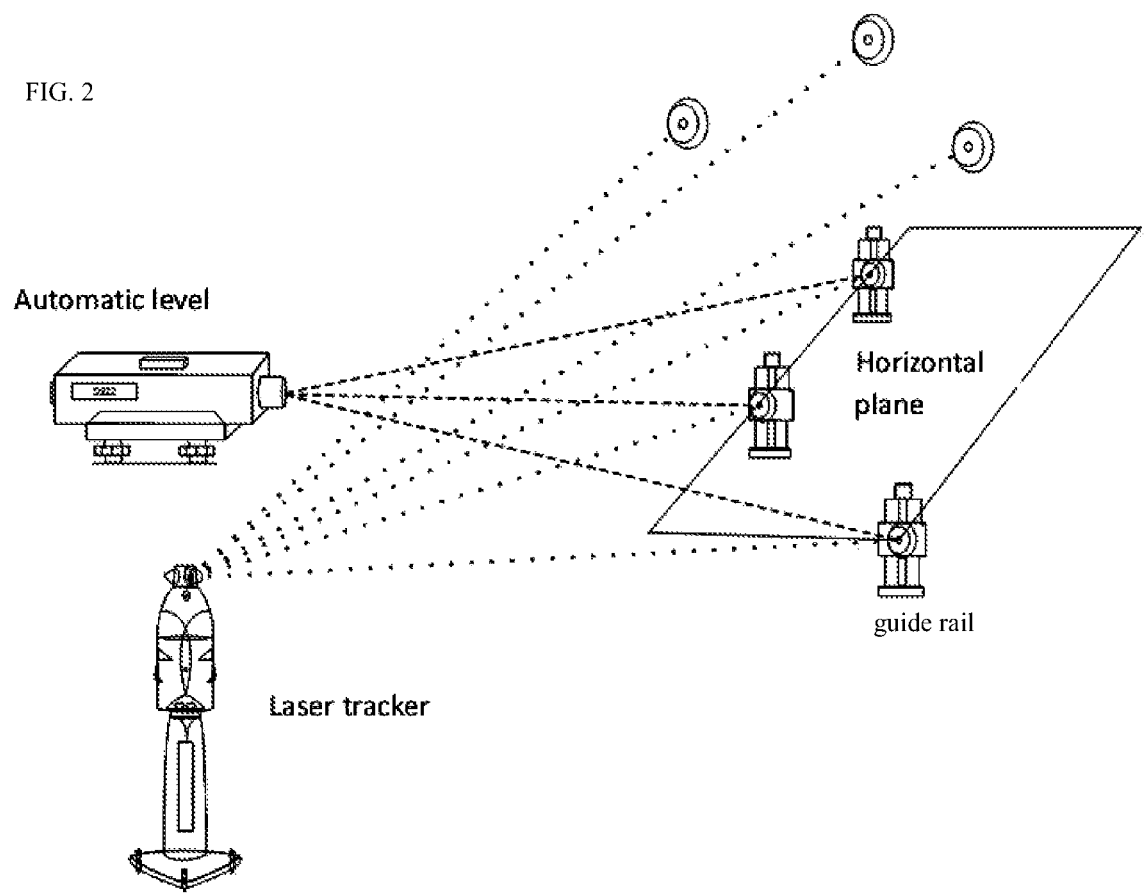
FIG. 2 is the establishment diagram of the horizontal reference frame of the present invention.
Figure 4:
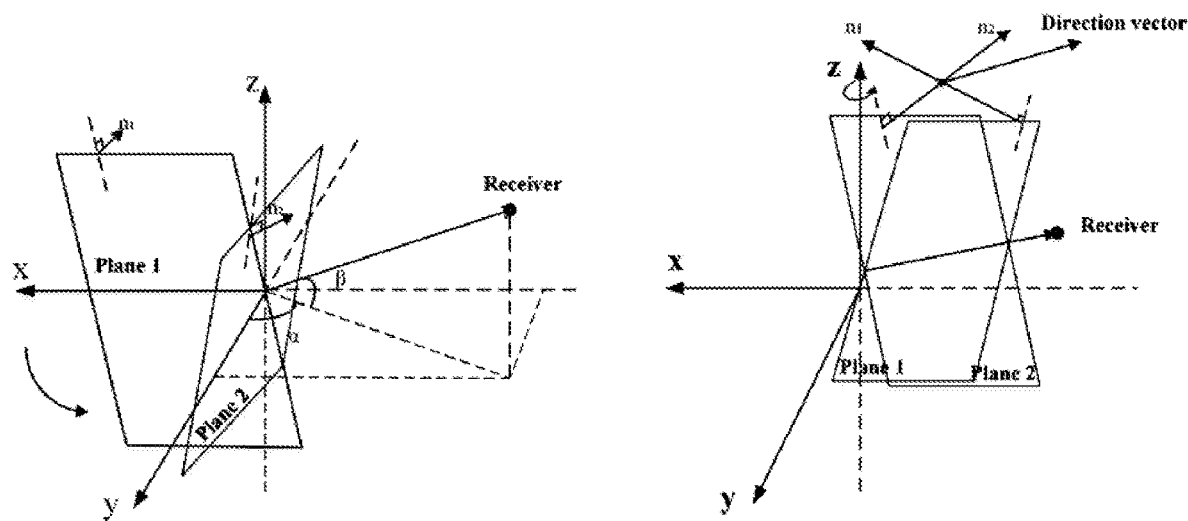
FIG. 4 is the measurement model diagram of the transmitter.

Step 2: as shown in FIG. 2, fixing an automatic level in the space and calibrating it by bubble level called "optical composite image level" to parallel to the horizontal plane; the automatic level in this embodiment is selected from DSZ2 produced by Suzhou FOIF Co., Ltd., which settling uncertainty accuracy is no more than 0.3", the standard deviation over a 1 km double run is no more than ±1 mm;

Arranging a plurality of spherical receivers having a diameter of 1.5 inches and the corresponding spherical holders; the dimension of the spherical receiver is same as that of SMR of the laser tracker so as to ensure the center of the receiver is at the same point after the replacement by the SMR; arranging a lifting guide rail which is fixed with said spherical holders, replacing the spherical receivers with SMRs of the laser tracker on the holders, wherein the center of the SMR is visible; adjusting the guide rail to ensure that the center of each SMR is in the same horizontal plane by using the automatic level, thus, finishing the arrangement of the target points on the horizontal reference plane;

Measuring target points and other points by the laser tracker and establishing the horizontal reference frame $O_h$-$x_h y_h z_h$ in accordance with the target points as xoy plane;

As shown in FIG. 4, arranging transmitters in front of the horizontal reference frame according to the measurement range and measurement model of the transmitters, setting spherical receivers on the respective points on the horizontal reference frame, respectively; receiving scanning optical plane signal and synchronous marked optical signal of the transmitters, and obtaining rotation matrix $R_T^H$ from the transmitter coordinate system to the horizontal reference frame via space-resection method.

Figure 3:
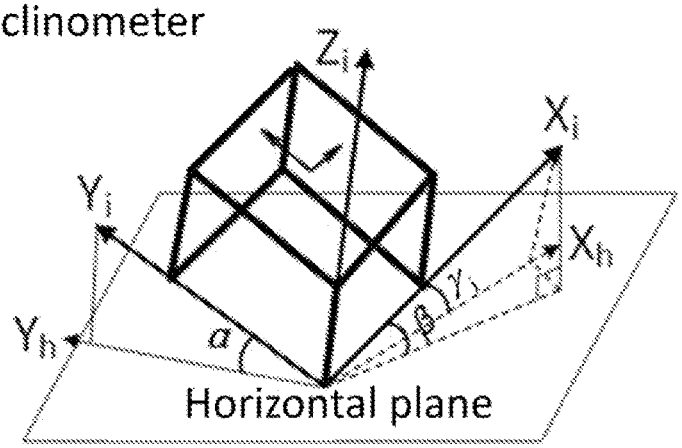
FIG. 3 is the measurement model diagram of the inclinometer.

Step 3: as shown in FIG. 3, defining a inclinometer coordinate system $O_i$-$x_i y_i z_i$, and obtaining readings of two axes of the inclinometer, and then converting readings of the inclinometer to rotation angle around the corresponding axis with respect to the inclinometer measurement model;

$$\begin{cases} \theta_i = \alpha \\ \gamma_i = -\arcsin\left(\dfrac{\sin \beta}{\cos \alpha}\right) \end{cases}$$

Where $\alpha$ and $\beta$ are the readings, $\theta_i$ and $\gamma_i$ are rotation angles around x and y axes, respectively;

And the equation of rotation matrix $R_H^I$ from the horizontal reference frame to the inclinometer coordinate system is:

$$R_H^I = R_{yi} \cdot R_{xi} \cdot$$

$$R_{zi} = \begin{bmatrix} \cos \gamma_i & 0 & \sin \gamma_i \\ 0 & 1 & 0 \\ -\sin \gamma_i & 0 & \cos \gamma_i \end{bmatrix} \begin{bmatrix} 1 & 0 & 0 \\ 0 & \cos \theta_i & -\sin \theta_i \\ 0 & \sin \theta_i & \cos \theta_i \end{bmatrix} \begin{bmatrix} \cos \psi_i & -\sin \psi_i & 0 \\ \sin \psi_i & \cos \psi_i & 0 \\ 0 & 0 & 1 \end{bmatrix}$$

Where $\psi i$ is the rotation angle around z-axis in the rotation matrix;

Defining rotation matrix $R_T^I$ from the transmitter coordinate system to the inclinometer coordinate system, and parameterizing the rotation matrix as follows:

$$R_H^T = (R_T^H)^{-1} = \begin{bmatrix} r_1 & r_2 & r_3 \\ r_4 & r_5 & r_6 \\ r_7 & r_8 & r_9 \end{bmatrix} \quad R_T^I = \begin{bmatrix} r_{i1} & r_{i2} & r_{i3} \\ r_{i4} & r_{i5} & r_{i6} \\ r_{i7} & r_{i8} & r_{i9} \end{bmatrix}$$

Where $r_1 \ldots r_9$ are known parameters, and $r_{i1} \ldots r_{i9}$ are parameters to be solved;

Obtaining following equations according to rotation relationships among transmitter coordinate system, horizontal reference frame and inclinometer coordinate system:

$$R_H^I = R_T^I \cdot R_H^T \Rightarrow \begin{bmatrix} r_{i1}r_1 + r_{i2}r_4 + r_{i3}r_7 & r_{i1}r_2 + r_{i2}r_5 + r_{i3}r_8 & r_{i1}r_3 + r_{i2}r_6 + r_{i3}r_9 \\ r_{i4}r_1 + r_{i5}r_4 + r_{i6}r_7 & r_{i4}r_2 + r_{i5}r_5 + r_{i6}r_8 & r_{i4}r_3 + r_{i5}r_6 + r_{i6}r_9 \\ r_{i7}r_1 + r_{i8}r_4 + r_{i9}r_7 & r_{i7}r_2 + r_{i8}r_5 + r_{i9}r_8 & r_{i7}r_3 + r_{i8}r_6 + r_{i9}r_9 \end{bmatrix}$$

$$= \begin{bmatrix} \cos \gamma_i \cos \psi_i - \sin \theta_i \sin \gamma_i \sin \psi_i & \sin \theta_i \sin \gamma_i \cos \psi_i + \cos \gamma_i \sin \psi_i & -\cos \theta_i \sin \theta_i \\ -\cos \theta_i \sin \psi_i & \cos \theta_i \cos \psi_i & \sin \theta_i \\ \sin \theta_i \cos \gamma_i \sin \psi_i + \cos \psi_i \sin \gamma_i & \sin \psi_i \sin \gamma_i - \sin \theta_i \cos \gamma_i \cos \psi_i & \cos \theta_i \cos \gamma_i \end{bmatrix}$$

Obtaining simultaneous equations via the above equations:

$$\begin{cases} r_{i1}r_3 + r_{i2}r_6 + r_{i3}r_9 = -\cos\theta_i \sin\gamma_i \\ r_{i4}r_3 + r_{i5}r_6 + r_{i6}r_9 = \sin\theta_i \\ r_{i7}r_3 + r_{i8}r_6 + r_{i9}r_9 = \cos\theta_i \cos\gamma_i \end{cases} ;$$

Regulating at least three attitudes of the transmitter by mechanical adjustment, solving the least squares solution of the linear equations to obtain $r_{i1} \ldots r_{i9}$, e.g. to obtain the rotation matrix from transmitter coordinate system to inclinometer coordinate system;

Constructing a non-linear optimization objective equation combining the orthogonal constraints of the rotation matrix and performing optimization solution via iterative algorithm to obtain the exact solution of the rotation matrix from transmitter coordinate system to inclinometer coordinate system;

$$E = \sum_{j=1}^{n} (F_{j1}^2 + F_{j2}^2 + F_{j3}^2) + M \sum_{j=1}^{6} f_j^2$$

Where $\begin{cases} F_{j1} = r_{i1}r_{j3} + r_{i2}r_{j6} + r_{i3}r_{j9} + \sin\gamma_{ji}\cos\theta_{ji} \\ F_{j2} = r_{i4}r_{j3} + r_{i5}r_{j6} + r_{i6}r_{j9} - \sin\theta_{ji} \\ F_{j3} = r_{i7}r_{j3} + r_{i8}r_{j6} + r_{i9}r_{j9} - \cos\theta_{ji}\cos\gamma_{ji} \end{cases}$ $$\begin{cases} f_1 = r_{i1}^2 + r_{i2}^2 + r_{i3}^2 - 1 = 0 \\ f_2 = r_{i4}^2 + r_{i5}^2 + r_{i6}^2 - 1 = 0 \\ f_3 = r_{i7}^2 + r_{i8}^2 + r_{i9}^2 - 1 = 0 \\ f_4 = r_{i1}i_4 + r_{i2}i_5 + r_{i3}i_6 = 0 \\ f_5 = r_{i1}i_7 + r_{i2}i_8 + r_{i3}i_9 = 0 \\ f_6 = r_{i4}i_7 + r_{i5}i_8 + r_{i6}i_9 = 0 \end{cases},$$

where n is the number of attitudes of the transmitter by mechanical adjustment, n>=3.

Step 4: Obtaining readings of the inclinometer in real time; according to the calibrated rotation matrix from transmitter coordinate system to inclinometer coordinate system, calculating the updated rotation matrix of the transmitter attitude, compensating the transmitter attitude in real time and obtaining the attitude compensation algorithm as follows:

$(C_T)_{new} = (R_T^I)^{-1} \cdot (R_H^I)_{new} \cdot ((R_H^I)_{old})^{-1} \cdot R_T^I \cdot (C_T)_{old}.$ Consequently, the present invention achieves an attitude self-compensation method to the transmitters of wMPS based on inclinometer. By the high-accuracy attitude perception of the inclinometer, the method of the present invention compensates and updates the attitude of transmitters, which effectively avoids the attitude change of the transmitters caused by vibration or creep in harsh environments, and greatly improves the stability of the overall measurement field. The present invention satisfies the current high-accuracy and wide range measurement requirements and improves applicability of wMPS.

The inclinometer measurement model involved in the present invention can refer to the reference of "Wen X., 2011 Research on error compensation of inclinometer in pose measurement of shield machine, Huazhong University of Science and Technology"; The transmitter measurement model involved in the present invention can refer to the reference of "Yang L., 2010 Research on large-scale space coordinate measurement location technology based on optical scanning, Tianjin University";

The space resection measurement method involved in the present invention can refer to the reference of "Liu X., 2014 Research on measurement and positioning method in large complex field, Tianjin University".

Although the functions and working processes of the present invention have been described above with reference to the accompanying drawings, the present invention is not limited thereto. The foregoing specific implementations are merely illustrative but not limiting. A person of ordinary skill in the art may make various forms under the teaching of the present invention without departing from the purpose of the present invention and the protection scope of the appended claims, and all the forms shall fall into the protection scope of the present invention.

What is claimed is:

1. An attitude self-compensation method of transmitters of wMPS based on an inclinometer, comprising the following steps:
    step 1: arranging inclinometer-combined transmitters according to mechanism structures of the transmitters;
    step 2: building a horizontal reference frame based on an automatic level and a guide rail;
    step 3: calibrating a rotation relationship between an inclinometer and a transmitter coordinate system by referring to a horizontal reference frame according to a measurement model of the inclinometer and a rotation measurement model of the transmitter;
    step 4: updating orientation parameters of the transmitters in real time according to output values of the inclinometer and a compensation algorithm for the orientation parameters.

2. The attitude self-compensation method of a transmitter of wMPS based on an inclinometer according to claim 1, wherein the steps of "building a horizontal reference frame" in step 2 are as follows:
    step 2-1: arranging an automatic level, and adjusting it by an optical composite image level to parallel a horizontal plane;
    step 2-2: arranging a plurality of spherical receivers and corresponding spherical holders;
    step 2-3: arranging a guide rail which is fixed with the spherical holders, replacing the spherical receivers with spherically mounted retroreflectors (SMR) of a laser tracker on the corresponding spherical holders, adjusting the guide rail to ensure that a center of each SMR is in a same horizontal plane by using the automatic level, thus, finishing arrangements of target points on the horizontal plane; each SMR has a diameter of 1.5 inches;
    step 2-4: measuring the target points and other points by the laser tracker and establishing a horizontal reference frame $O_h$-$x_h y_h z_h$ in accordance with the target points as xoy plane.

3. The attitude self-compensation method of transmitters of wMPS based on an inclinometer according to claim 2, wherein each of the spherical holders has a diameter of 1.5 inches.

4. The attitude self-compensation method of transmitter of wMPS based on an inclinometer according to claim 1, wherein the steps of "calibrating a rotation relationship between an inclinometer and transmitter coordinate system" in Step 3 are as follows:
    step 3-1: arranging transmitters in front of a horizontal reference frame according to a measurement range of the transmitters, and measuring total target points of the horizontal reference frame by the transmitters;
    step 3-2: defining a transmitter coordinate system $O_t$-$x_t y_t z_t$, calculating a rotation matrix from the transmitter coordinate system to the horizontal reference frame according to a measurement model of the transmitters, wherein a relationship between two coordinates is as follows:

$$\begin{bmatrix} a_m \cos\theta_m + b_m \sin\theta_m \\ a_m \sin\theta_m - b_m \cos\theta_m \\ c_m \\ d_m \end{bmatrix}^T \cdot \begin{bmatrix} R_T^H & T_T^H \\ 0 & 1 \end{bmatrix} \cdot \begin{bmatrix} x_h \\ y_h \\ z_h \\ 1 \end{bmatrix} = 0$$

where $(a_m, b_m, c_m, d_m)$ m=1, 2 is an optical plane equation, m is a number of the optical plane equation, $\theta$ is a sweep angle of the transmitter, $(x_h, y_h, z_h)$ is coordinates of the horizontal reference frame; and $R_T^H$, $T_T^H$ are a rotation matrix and a translation matrix from the transmitter coordinate system to the horizontal reference frame, respectively;
    step 3-3: obtaining the rotation matrix $R_T^H$ from the transmitter coordinate system to the horizontal reference frame via a space-resection method;
    step 3-4: establishing an inclinometer measurement model, and defining an inclinometer coordinate system $O_i$-$x_i y_i z_i$;
    step 3-5: converting readings of the inclinometer to a rotation angle around a corresponding axis with respect to the inclinometer measurement model;

$$\begin{cases} \theta_i = \alpha \\ \gamma_i = -\arcsin\left(\dfrac{\sin\beta}{\cos\alpha}\right) \end{cases}$$

where $\alpha$ and $\beta$ are the readings, $\theta_i$ and $\gamma_i$ are rotation angles around x and y axes, respectively;
and an equation of rotation matrix $R_H^I$ from the horizontal reference frame to the inclinometer coordinate system is:

$$R_H^I = R_{yi} \cdot R_{xi} \cdot$$

$$R_{zi} = \begin{bmatrix} \cos\gamma_i & 0 & \sin\gamma_i \\ 0 & 1 & 0 \\ -\sin\gamma_i & 0 & \cos\gamma_i \end{bmatrix} \begin{bmatrix} 1 & 0 & 0 \\ 0 & \cos\theta_i & -\sin\theta_i \\ 0 & \sin\theta_i & \cos\theta_i \end{bmatrix} \begin{bmatrix} \cos\psi_i & -\sin\psi_i & 0 \\ \sin\psi_i & \cos\psi_i & 0 \\ 0 & 0 & 1 \end{bmatrix}$$

where $\psi_i$ is an rotation angle around z-axis in the rotation matrix;

step 3-6: defining a rotation matrix $R_T^I$ from the transmitter coordinate system to the inclinometer coordinate system, and parameterizing the rotation matrix as follows:

$$R_H^T = (R_T^H)^{-1} = \begin{bmatrix} r_1 & r_2 & r_3 \\ r_4 & r_5 & r_6 \\ r_7 & r_8 & r_9 \end{bmatrix} \quad R_T^I = \begin{bmatrix} r_{i1} & r_{i2} & r_{i3} \\ r_{i4} & r_{i5} & r_{i6} \\ r_{i7} & r_{i8} & r_{i9} \end{bmatrix}$$

where $r_1 \ldots r_9$ are known parameters, and $r_{i1} \ldots r_{i9}$ are parameters to be solved;

step 3-7: obtaining an equation $R_H^I = R_T^I \cdot R_H^T$ according to rigid transformation relations, and obtaining the following equations after mathematical processing:

$$\begin{cases} r_{i1}r_3 + r_{i2}r_6 + r_{i3}r_9 = -\cos\theta_i \sin\gamma_i \\ r_{i4}r_3 + r_{i5}r_6 + r_{i6}r_9 = \sin\theta_i \\ r_{i7}r_3 + r_{i8}r_6 + r_{i9}r_9 = \cos\theta_i \cos\gamma_i \end{cases}$$

step 3-8: regulating at least three attitudes of the transmitters by mechanical adjustment, constructing a nonlinear optimization objective equation combining orthogonal constraints of the rotation matrix and performing optimization solution via an iterative algorithm as $$E = \sum_{j=1}^{n}(F_{j1}^2 + F_{j2}^2 + F_{j3}^2) + M\sum_{j=1}^{6} f_j^2$$

$$\text{where } \begin{cases} F_{j1} = r_{i1}r_{j3} + r_{i2}r_{j6} + r_{i3}r_{j9} + \sin\gamma_i \cos\theta_{ji} \\ F_{j2} = r_{i4}r_{j3} + r_{i5}r_{j6} + r_{i6}r_{j9} - \sin\theta_{ji} \\ F_{j3} = r_{i7}r_{j3} + r_{i8}r_{j6} + r_{i9}r_{j9} - \cos\theta_{ji} \cos\gamma_{ij} \end{cases}$$

-continued $$\begin{cases} f_1 = r_{i1}^2 + r_{i2}^2 + r_{i3}^2 - 1 = 0 \\ f_2 = r_{i4}^2 + r_{i5}^2 + r_{i6}^2 - 1 = 0 \\ f_3 = r_{i7}^2 + r_{i8}^2 + r_{i9}^2 - 1 = 0 \\ f_4 = r_{i1}r_{i4} + r_{i2}r_{i5} + r_{i3}r_{i6} = 0 \\ f_5 = r_{i1}r_{i7} + r_{i2}r_{i8} + r_{i3}r_{i9} = 0 \\ f_6 = r_{i4}r_{i7} + r_{i5}r_{i8} + r_{i6}r_{i9} = 0 \end{cases} \begin{cases} f_1 = r_{i1}^2 + r_{i2}^2 + r_{i3}^2 - 1 = 0 \\ f_2 = r_{i4}^2 + r_{i5}^2 + r_{i6}^2 - 1 = 0 \\ f_3 = r_{i7}^2 + r_{i8}^2 + r_{i9}^2 - 1 = 0 \\ f_4 = r_{i1}r_{i4} + r_{i2}r_{i5} + r_{i3}r_{i6} = 0 \\ f_5 = r_{i1}r_{i7} + r_{i2}r_{i8} + r_{i3}r_{i9} = 0 \\ f_6 = r_{i4}r_{i7} + r_{i5}r_{i8} + r_{i6}r_{i9} = 0 \end{cases},$$

n is the number of attitudes of the transmitter by mechanical adjustment, n>=3.

5. The attitude self-compensation method of transmitters of wMPS based on an inclinometer according to claim 1, wherein the step of "updating orientation parameters of the transmitters in real time" of step 4 are as follows:

step 4-1: obtaining readings of the inclinometer in real time, calculating a rotation matrix from a horizontal reference frame to an inclinometer coordinate system;

step 4-2: calculating an updated attitude matrix of the transmitters according to a calibrated rotation matrix from the transmitter coordinate system to the inclinometer coordinate system, compensating a new attitude of the transmitters and obtaining an attitude compensation algorithm as follows:

$$(C_T)_{new} = (R_T^I)^{-1} \cdot (R_H^I)_{new} \cdot ((R_H^I)_{old})^{-1} \cdot R_T^I \cdot (C_T)_{old}$$

Where $(C_T)_{new}$, $(C_T)_{old}$ are a new transmitter coordinate system and an initial transmitter coordinate system, respectively; $(R_H^I)_{new}$, $(R_H^I)_{old}$ are a new rotation matrix and an initial rotation matrix of the inclinometer, respectively.

6. The attitude self-compensation method of transmitters of wMPS based on an inclinometer according to claim 1, wherein a settling uncertainty accuracy of the automatic level is no more than 0.3", a standard deviation over a 1 km double run is no more than ±1 mm.

\* \* \* \* \*